United States Patent
Memhard et al.

(10) Patent No.: US 6,201,859 B1
(45) Date of Patent: Mar. 13, 2001

(54) METHOD AND APPARATUS FOR CONTROLLING PARTICIPANT INPUT IN A CONFERENCING ENVIRONMENT

(75) Inventors: Jennifer Memhard; Daniel R. Porter; Anthony C. Salvador, all of Portland; Rune A. Skarbo, Hillsboro, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/978,666

(22) Filed: Nov. 26, 1997

Related U.S. Application Data

(63) Continuation of application No. 08/458,445, filed on Jun. 2, 1995, now abandoned.

(51) Int. Cl.[7] .............................. H04M 11/00; H04N 7/15
(52) U.S. Cl. ......................... 379/93.21; 348/15; 345/331
(58) Field of Search ................................ 348/15, 14, 16, 348/17; 379/202, 204, 206, 93.21; 370/260; 345/329, 330, 331, 332

(56) References Cited

U.S. PATENT DOCUMENTS

| | | |
|---|---|---|
| 4,531,024 | 7/1985 | Colton et al. . |
| 4,785,448 | 11/1988 | Reichert et al. . |
| 4,805,205 * | 2/1989 | Faye ........................................ 379/96 |
| 4,953,159 | 8/1990 | Hayden et al. . |
| 5,003,532 * | 3/1991 | Ashida et al. ........................... 348/15 |
| 5,206,934 | 4/1993 | Naef, III . |
| 5,341,374 * | 8/1994 | Lewen et al. ........................... 370/62 |
| 5,392,400 | 2/1995 | Berkowitz et al. . |
| 5,423,044 | 6/1995 | Sutton et al. . |
| 5,473,363 * | 12/1995 | Ng et al. ................................. 348/15 |
| 5,473,367 * | 12/1995 | Bales et al. ............................. 348/15 |
| 5,491,743 * | 2/1996 | Shiio et al. ............................. 348/15 |
| 5,529,840 * | 6/1996 | Colton et al. .......................... 348/15 |
| 5,539,741 * | 7/1996 | Barraclough et al. ............... 379/202 |
| 5,539,886 * | 7/1996 | Aldred et al. ........................ 379/202 |
| 5,617,539 * | 4/1997 | Ludwig et al. ...................... 370/260 |

OTHER PUBLICATIONS

Isaacs, Ellen A., Trevor Morris and Thomas K. Rodriquez, "A Forum for Supporting Interactive Presentations to Distributed Audiences", Oct. 1994, pp. 405–416.

PCT International Search Report dated Aug. 27, 1996.

* cited by examiner

*Primary Examiner*—Stella Woo
(74) *Attorney, Agent, or Firm*—Blakely, Sokoloff, Taylor & Zafman LLP

(57) ABSTRACT

A method and apparatus for controlling participant input in a conferencing environment supporting at least first and second end points which can operate in at least two different modes. While in the first operating mode, the end points can make changes to the conference data at will. The conference remains in the first operating mode until a request is received from a participant to change the conference to a second operating mode. Once this request is received, the conference switches to the second operating mode. While in the second operating mode, only one of the first and second end points can make changes at any particular time.

32 Claims, 9 Drawing Sheets

METHOD AND APPARATUS FOR CONTROLLING PARTICIPANT INPUT IN A CONFERENCING ENVIRONMENT

This is a continuation of application Ser. No. 08/458,445, filed Jun. 2, 1995, now abandoned.

BACKGROUND OF THE INVENTION

1. Field of the Invention

The present invention pertains to the field of data and video conferencing. More particularly, this invention relates to controlling individual participants' inputs to a data and/or video conference.

2. Background

Computer technology is continuously advancing, resulting in modern computer systems which provide ever-increasing performance. One result of this improved performance is an increased use of computer systems by individuals in a wide variety of business, academic and personal applications. One such use is that of data and/or video conferencing, where users of multiple computer systems in different locations communicate with each other. These different locations can span virtually any distance, such as between two offices in the same building or between two offices in different countries.

The benefits of such conferencing are numerous. Among these benefits is the ability of multiple individuals to effectively and quickly communicate information and ideas to one another over large distances. The information and ideas can be displayed by each computer system, and frequently verbal discussions can accompany the images. Data and video can both be transmitted in a conferencing environment. Typically, data conferencing refers to sharing documents and video conferencing refers to sharing images.

However, several problems can arise in a conferencing environment. One such problem results from the sharing of documents. If multiple users are viewing the same document simultaneously, each of the users may attempt to change the document at the same time. At times this may be beneficial, however at other times this can create substantial confusion among the participants, as well as result in the loss of data. Thus, it would be beneficial to provide a method for enforcing order in a conferencing environment.

Additionally, in many conferencing environments technological limitations in the communications links between the conferencing sites prevents all visual images from all of the conferencing sites from being seen simultaneously. Therefore, a choice must be made as to which conferencing sites are being viewed at any particular time. Thus, it would be beneficial to provide a system which automatically selects which conferencing site is to be viewed at any particular time.

Furthermore, specific users may desire to view specific conferencing sites, such as a site which has not been automatically selected to be viewed. Thus, it would be beneficial to provide a system which allows individuals to select which conferencing sites they view at any particular time.

The present invention provides for these and other advantageous results.

SUMMARY OF THE INVENTION

A method and apparatus for controlling participant input in a conferencing environment is described herein. A conference typically includes at least first and second end points which can operate in at least two different modes. While in the first operating mode, the end points can make changes to the conference data at will. The conference remains in the first operating mode until a request is received from a participant to change the conference to a second operating mode. Once this request is received, the conference switches to the second operating mode. While in the second operating mode, only one of the first and second end points can make changes at any particular time.

In one embodiment, the conference includes audio/video data. In this embodiment, an audio/video chairperson is identified in the second operating mode. The audio/video chairperson can determine the current speaker at any given time.

In one embodiment, the conference includes shared application data. In this embodiment, a token is created for a shared application when in the second operating mode, and whichever end point holds the token at any particular time can make changes to the shared application at that time.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
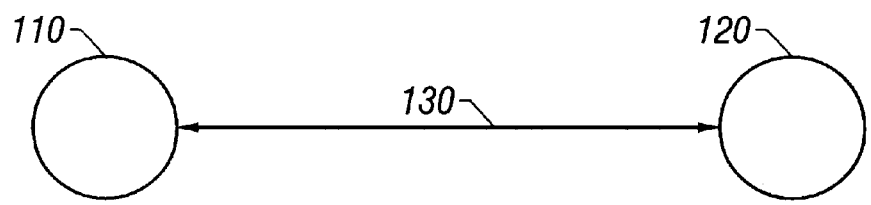
FIG. 1 shows a conferencing environment according to one embodiment of the present invention.

FIG. 1 shows a conferencing environment according to one embodiment of the present invention. The conferencing environment of FIG. 1 includes two end points 110 and 120 coupled together by a communication link 130. In one implementation, each of the end points 110 and 120 are general personal computer systems. Alternatively, end points 110 and 120 could be dedicated conferencing systems.

Communication link 130 represents any of a wide variety of conventional communication media. For example, communication link 130 can be an ISDN or POTS line, Ethernet cable, a fiber optic line, etc. Additionally, communication link 130 can be a wireless communication medium, such as signals propagating in the infrared or radio frequencies. Furthermore, communication link 130 can be a combination of communication media and can include converting devices for changing the form of the signal based on the communication media being used.

Figure 2:
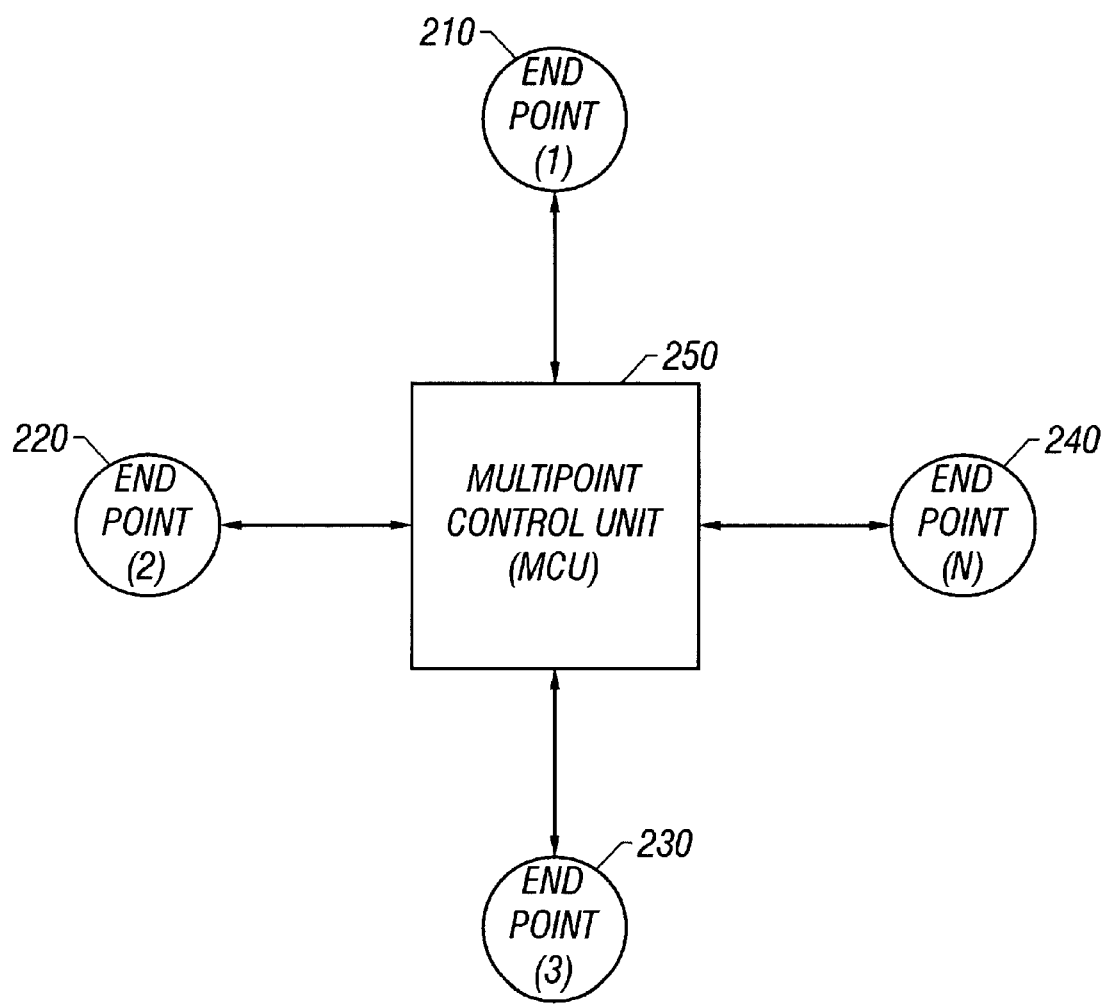
FIG. 2 shows a conferencing environment according to another embodiment of the present invention.

FIG. 2 shows a conferencing environment according to another embodiment of the present invention. The conferencing environment of FIG. 2 includes multiple (N) end points: end point 210, end point 220, end point 230, and end point 240. Each of the end points 210–240 are coupled together via a multipoint control unit (MCU) 250. MCU 250 is a switching device which transfers inputs received from each end point to the other end points. MCU 250 is coupled to each end point via a communication link, as shown in FIG. 2. Each communication link can be any of a wide variety of conventional communication media, analogous to communication link 130 of FIG. 1 discussed above.

In one embodiment of the present invention, MCU 250 is a dedicated switching device. In an alternate embodiment, MCU 250 is implemented in software, such as on a computer system coupled to a LAN. It is to be appreciated that any of a wide variety of conventional multipoint control units can be used with the present invention. In one implementation, the MCU conforms to the International Telecommunication Union (ITU) telecommunications standard H.320.

In one embodiment of the present invention, multipoint conferences with two or more end points do not require MCU 250. In this embodiment, each end point receives all conferencing information and performs the switching function of MCU 250. However, in one embodiment MCU 250 is necessary for conferences with three or more end points which include audio, video and data information.

MCU 250 receives an input stream from each of the end points via the communication links. In one embodiment, the input stream comprises a visual input, an audio input, and a data input (e.g., information relating to shared applications). In an alternate embodiment, the input stream comprises a subset of these inputs, such as an audio input and a data input.

In one embodiment of the present invention, each end point 210–240 is coupled to a video camera. In one implementation, the video cameras coupled to the end points are ProShare™ video cameras. The video cameras provide a visual representation of the user of the end point, thereby allowing each conference participant to see the other participants, even though they may be separated by great distances.

MCU 250 also provides an output stream to each of the end points via the communication links. In one embodiment, the output stream comprises a visual output, an audio output, and a data output. In an alternate embodiment, the output stream comprises a subset of these outputs, such as an audio output and a data output. The output provided to an end point is the input received from another end point. Identifying which end point's input to output is described in more detail below.

Figure 3:
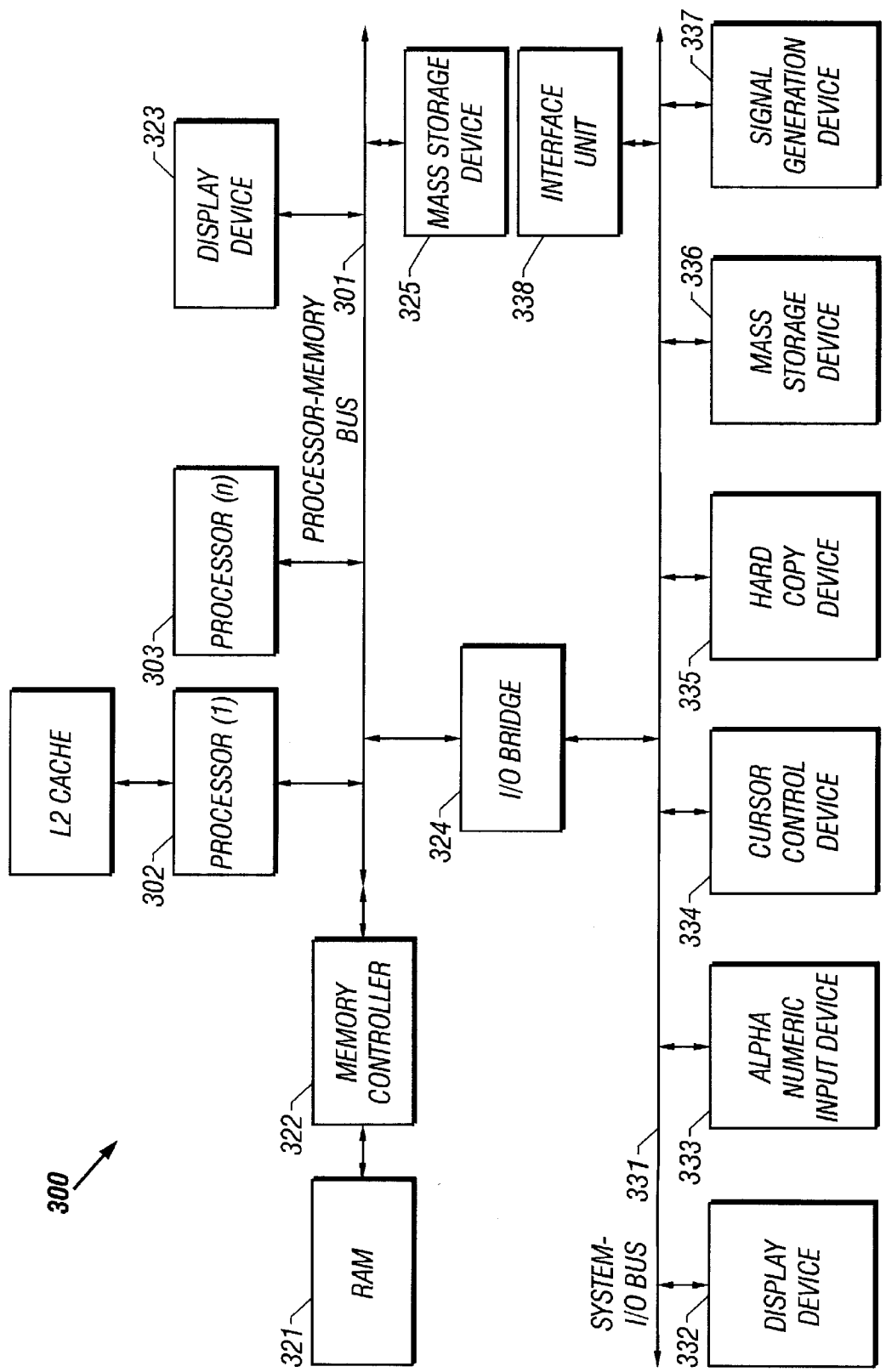
FIG. 3 shows an overview of a computer system which can be used in a conferencing environment according to one embodiment of the present invention.

FIG. 3 shows an overview of a computer system which can be used in a conferencing environment according to one embodiment of the present invention. In one embodiment, end points 110 and 120 of FIG. 1 are each a computer system 300 of FIG. 3. In another embodiment, each of the end points coupled to MCU 250 of FIG. 2 is a computer system 300 of FIG. 3. In another alternate embodiment, MCU 250 of FIG. 2 is a computer system 300 of FIG. 3.

The computer system 300 generally comprises a processor-memory bus or other communication means 301 for communicating information between one or more processors 302 and 303. Processor-memory bus 301 includes address, data and control buses and is coupled to multiple devices or agents. Processors 302 and 303 may include a small, extremely fast internal cache memory, commonly referred to as a level one (L1) cache memory for temporarily storing data and instructions on-chip. In addition, a bigger, slower level two (L2) cache memory 304 can be coupled to processor 302 or processor 303 for temporarily storing data and instructions for use by the processor. In one embodiment, processors 302 and 303 are Intel® architecture compatible microprocessors, such as i386™, i486™, or Pentium™ processors. However, the present invention may utilize any type of microprocessor, including different types of processors.

Also coupled to processor-memory bus 301 is processor 303 for processing information in conjunction with processor 302. Processor 303 may comprise a parallel processor, such as a processor similar to or the same as processor 302. Alternatively, processor 303 may comprise a co-processor, such as a digital signal processor. The processor-memory bus 301 provides system access to the memory and input/ output (I/O) subsystems. A memory controller 322 is coupled with processor-memory bus 301 for controlling access to a random access memory (RAM) or other dynamic storage device 321 (commonly referred to as a main memory) for storing information and instructions for processor 302 and processor 303. A mass data storage device 325, such as a magnetic disk and disk drive, for storing information and instructions, and a display device 323, such as a cathode ray tube (CRT), liquid crystal display (LCD), etc., for displaying information to the computer user are coupled to processor-memory bus 301.

An input/output (I/O) bridge 324 is coupled to processor-memory bus 301 and system I/O bus 331 to provide a communication path or gateway for devices on either processor-memory bus 301 or I/O bus 331 to access or transfer data between devices on the other bus. Essentially, bridge 324 is an interface between the system I/O bus 331 and the processor-memory bus 301.

System I/O bus 331 communicates information between peripheral devices in the computer system. In one embodiment, system I/O bus 331 is a Peripheral Component Interconnect (PCI) bus. Devices that may be coupled to system I/O bus 331 include a display device 332, such as a cathode ray tube, liquid crystal display, etc., an alphanumeric input device 333 including alphanumeric and other keys, etc., for communicating information and command selections to other devices in the computer system (for example, processor 302) and a cursor control device 334 for controlling cursor movement. Moreover, a hard copy device 335, such as a plotter or printer, for providing a visual representation of the computer images and a mass storage device 336, such as a magnetic disk and disk drive, for storing information and instructions, and a signal generation device 337 may also be coupled to system I/O bus 331.

In one embodiment of the present invention, signal generation device 337 includes, as an input device, a standard microphone to input audio or voice data to be processed by the computer system. The signal generation device 337 includes an analog to digital converter to transform analog audio data to digital form which can be processed by the computer system. The signal generation device 337 also includes, as an output, a standard speaker for realizing the output audio from input signals from the computer system. Signal generation device 337 also includes well known audio processing hardware to transform digital audio data to audio signals for output to the speaker, thus creating an audible output.

In one embodiment of the present invention, signal generation device 337 also includes, as an input device, a ProShare™ video camera to input video images to be processed by the computer system. The video camera is coupled to an analog to digital converter to transfer analog video data to digital form which can be processed by the computer system.

An interface unit 338 is also coupled with system I/O bus 331. Interface unit 338 allows system 300 to communicate with other computer systems by sending and receiving the video, audio and data signals for the conference, as well as the necessary control signals based on the communication medium being used. In one embodiment, interface 338 is a conventional ISDN adapter which provides communication between the system 300 and an ISDN line. Alternatively, interface unit 338 could be a modem, a conventional network adapter such as an Ethernet LAN adapter, or any of a wide variety of other communication devices.

The display device 332 used with the computer system and the present invention may be a liquid crystal device, cathode ray tube, or other display device suitable for creating graphic images and alphanumeric characters (and ideographic character sets) recognizable to the user. The cursor control device 334 allows the computer user to dynamically signal the two dimensional movement of a visible symbol (pointer) on a display screen of the display device 332. Many implementations of the cursor control device are known in the art including a trackball, trackpad, mouse, joystick or special keys on the alphanumeric input device 333 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled.

Certain implementations of the present invention may include additional processors or other components. Additionally, certain implementations of the present invention may not require nor include all of the above components. For example, processor 303, display device 323, or mass storage device 325 may not be coupled to processor-memory bus 301. Furthermore, the peripheral devices shown coupled to system I/O bus 331 may be coupled to processor-memory bus 301; in addition, in some implementations only a single bus may exist with the processors 302 and 303, memory controller 322, and peripheral devices 332 through 339 coupled to the single bus.

In one embodiment of the present invention, applications are shared between multiple systems in the conferencing environment by having the application execute on only a single system. This is typically referred to as "application sharing". The system which executes the application is referred to as the host system. The host system transfers the necessary information between the host system and one or more end points to allow the end point(s) to display the application, and appear to the users of the end point(s) as if the application were actually executing at the end point(s).

Additionally, in one embodiment applications are also shared between multiple systems in the conferencing environment where the application is executing at all of the end points. When an application is executing at multiple end points, each participant can make changes to the application data at his or her end point (subject to the turn-taking controls of the present invention). The end point then sends a message to all of the other end points indicating the changes which were made by the participant. The other end points receive these messages and provide the changes as inputs to the application they are executing. In one implementation, the ProShare™ notebook is executed on each of the end points.

Figure 4:
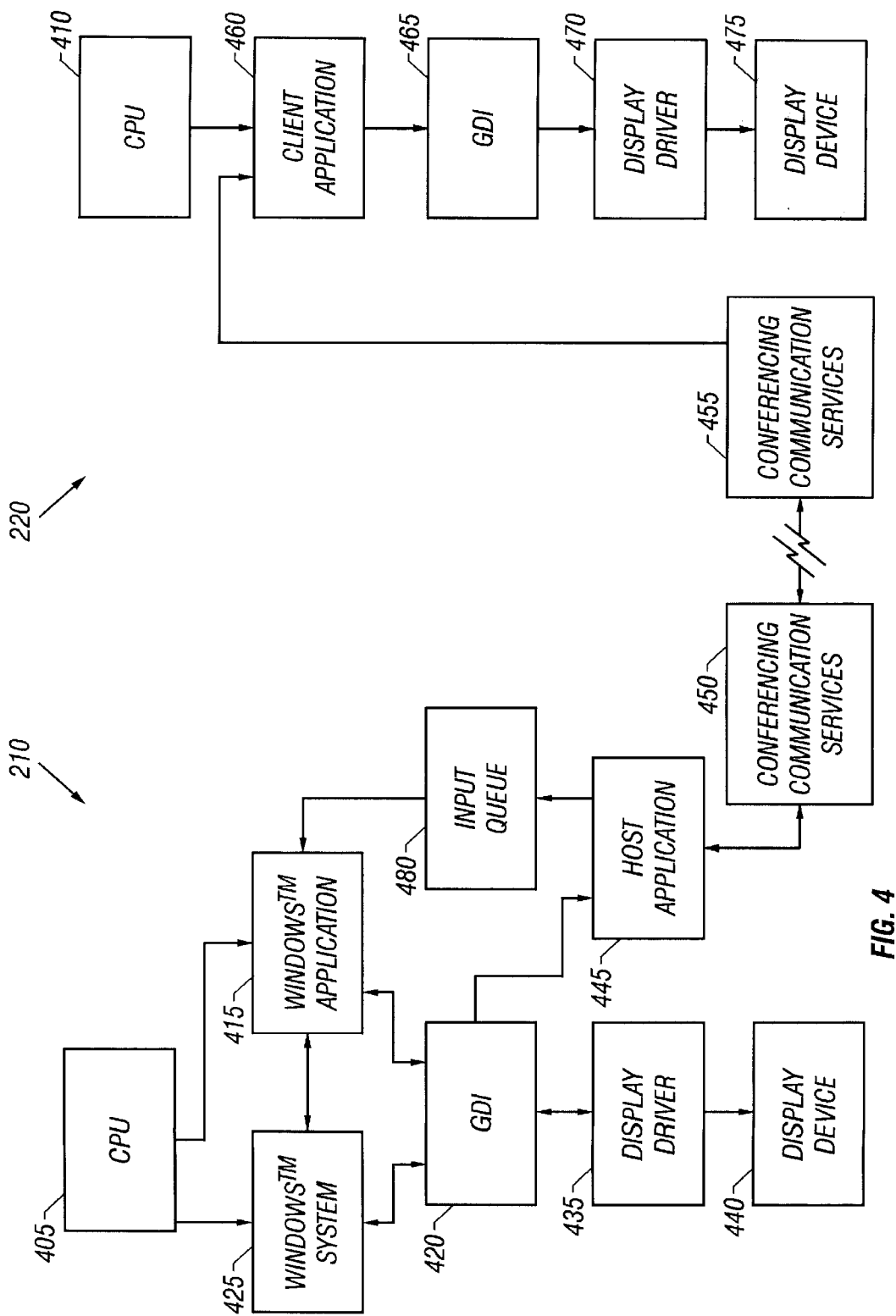
FIG. 4 is a block diagram illustrating the flow of information between end points in application sharing as supported by one embodiment of the present invention.

FIG. 4 is a block diagram illustrating the flow of information between end points in application sharing as supported by one embodiment of the present invention. It is to be appreciated that although two end points are shown in FIG. 4, the flow of information applies analogously to conferencing environments including three or more end points.

CPU 405 drives applications on end point 210, while CPU 410 drives applications on end point 220. In end point 210, a normal Windows™ application 415 such as Word™ is interfaced with Windows™ system 425 and graphical device interface (GDI) 420, which is software providing capabilities, including drawing capabilities, to Windows™ system 425. It is to be appreciated, however, that any of a wide variety of operating systems can be used with the conferencing system of the present invention; the conferencing system is specifically not limited to using only the Windows™ operating system.

When Windows™ application 415 calls GDI 420 to perform a drawing, GDI 420 calls display driver 435. Display driver 435 actually performs the prompted drawings on display device 440 of end point 210.

Host application 445 detects when GDI 420 makes a call to display driver 435. All of the information necessary for a given display driver to perform prompted line drawings and/or text drawings is retrieved and saved by host application 445 for use in the application sharing process between end point 210 and end point 220.

Upon retrieving and saving the necessary information to enable a given display driver to perform the prompted drawings on a display device, host application 445 formats a communication packet, also referred to as a message, based upon the display information retrieved from GDI 420 regarding the prompted drawings. Host application 445 then transmits the message to conferencing communication services 450 which transmits the message to conferencing communication services 455 of end point 220. In one embodiment, the message is broadcast from end point 210 to all other end points of the conference.

The message is received by client application 460 of end point 220, which calls GDI 465. GDI 465 in turn calls display driver 470. Display driver 470 performs drawings on display device 475 of end point 220 as indicated in the message transmitted by host application 445 of end point 210.

When the remote user makes changes to an application at end point 220, client application 460 senses the changes and checks whether they are to a shared or local application. If the changes are to a shared application, then client application 460 retrieves all of the information necessary for a display driver to perform the changes and forwards the information to conferencing communication services 455. Conferencing communication services 455 generates a packet including this information and sends the packet to host application 445 of end point 210 via conferencing communication services 450.

Host application 445 receives the changes and forwards them to first-in first-out (FIFO) input queue 480. The changes eventually propagate to the top of input queue 480, where they are input to Windows™ application 415. The changes are then made, via GDI 420, as discussed above. Note that host application 445 senses the changes when they are made. In one embodiment, host application 445 maintains a record of changes which are received from end point 220 and does not forward changes which it senses from GDI 420 to end point 220 if they were originally received from end point 220. However, messages are still sent to the other end points which share the application.

The present invention supports both data conferences and audio/video conferences. A data conference is a conference where one or more documents are displayed to each participant (e.g., application sharing or the ProShare™ notebook). An audio/video conference is a conference where one or more visual images of conference participants are displayed to each participant along with audio signals from the participants. The present invention also supports data and audio/video conferences concurrently, such as by displaying a conference participant, a document(s), and providing the participant's voice simultaneously. The conference data of a conference refers to the data or information being provided to the conference participants, such as a shared application information, video images or audio signals.

During an audio/video and/or data (AVD) conference, multiple conference participants can provide inputs to the conference simultaneously. These inputs can be, for example, changes to a document, audio inputs (e.g., by speaking into a microphone), or visual inputs (e.g., moving within the field of view of the video camera). Whether these inputs are output to the other end points depends on the operating mode of the conference, as discussed in more detail below.

The present invention supports two types of control, referred to as operating modes, in a data conference. The first type is referred to as a "free-for-all". In a free-for-all, MCU 250 forwards all changes made by the conference participants to all of the other end points. In one embodiment, in application sharing, the changes are forwarded to the host system, which then forwards the changes to all other end points.

The second type of control in a data conference is referred to as "turn-taking". When the conference is in turn-taking mode, an end point is able to input changes to the document (s) only when it has the "turn", also referred to as the "application token". A protocol is established to control when and how an end point can obtain the turn, as described in more detail below. Attempts to change a document on an end point at a time when the end point does not have the turn are denied. That is, the application data is not changed. Attempts to change a document on an end point at a time when the end point does have the turn are accepted by the conference and performed. Thus, by allowing only a single end point to have the turn at any given time, the present invention can restrict changes to the document(s) so that only a single end point can make changes at any given time, thereby reducing the confusion created by multiple concurrent changes to a document.

In one embodiment of the present invention, MCU 250 forwards all messages containing data conference information to all of the other end points. Each end point then decides whether to accept or reject the message, based on the operating mode of the data conference.

The present invention also supports two types of operating modes in an audio and/or video conference. The management control for an audio and/or video conference determines which of multiple conference participants can be seen and heard by the other participants. In one embodiment of the present invention, the bandwidth limitations of the communications links prevents MCU 250 from transmitting a real-time visual representation of all of the conference participants to all of the other participants. In one implementation, a single conference participant is shown to the other participants. In an alternate implementation, two or more conference participants are shown to the other participants.

The first type of management control in an audio and/or video conference is referred to as "voice-activated". Voice-activated control is similar to the free-for-all in data conferences. In voice-activated control, the audio and/or video signals from the conference participant who is currently speaking are provided to all conference participants. As soon as the current speaker changes, the audio and/or video signals from the new speaker are provided to the conference participants. MCU 250 determines which conference participant is currently speaking based on audio inputs received from the conference participants. In one embodiment, MCU 250 operates in a conventional manner to determine which end point has the largest volume input and identifies the participant at that end point as being the current speaker. In one implementation, MCU 250 takes into account the volume of the input, the duration of the input, the possibility of pauses during speech, and noise filtering. A wide variety of conventional processes can be used to determine the current speaker. These processes are well-known to those skilled in the art and thus will not be discussed further.

The second type of control in a video conference is referred to as "chaired" control. In chaired control, one of the conference participants is the "chairperson". The end point which the chairperson is using is referred to as the chair system. The chairperson determines which conference participant can currently speak at any particular time. In chaired control, the visual and audio inputs are received by MCU 250 as discussed above. The chairperson indicates to MCU 250 which conference participant is to be shown to all other participants (that is, which participant is the current speaker). MCU 250 outputs the visual and audio inputs from the current speaker to all other end points. The visual and audio inputs from all other conference participants are dropped by MCU 250.

It is to be appreciated that an AVD conference has a combination of the above operating modes. For example, a video portion of the conference can be in chaired mode while an application sharing portion can be in free-for-all mode. By way of another example, a video portion can be in voice-activated mode, a first application sharing portion can be in free-for-all mode, and a second application sharing portion can be in turn-taking mode.

One embodiment of the present invention uses a token referred to as the audio-visual (A/V) chair token to determine which participant is the conference chairperson. An individual can become the conference chairperson by requesting and obtaining the A/V chair token. In one embodiment of the present invention, the chairperson keeps the A/V chair token until it is requested by another conference participant. In one implementation, when requested by another participant, the chairperson can either keep the A/V chair token or relinquish it. If the A/V chair token is relinquished, then the requesting individual can subsequently grab the token. In an alternate implementation, when requested by another participant, the chairperson is given the option of keeping the token or transferring the token to the requesting participant. If multiple participants request the token concurrently, then the chairperson is given the option of which of the multiple participants, if any, is to receive the token.

In one embodiment of the present invention, each end point has a unique identifier. When an end point joins a conference, the MCU and all other end points in the conference record the identifier of the newly joining end point. Additionally, the MCU also stores information indicating which physical communication link that end point is coupled to, which enables the MCU to associate data inputs from that end point with that end point. In one implementation, a list of end point identifiers is stored by each end point and the MCU locally in RAM. By maintaining the unique end point identifiers, each end point is able to indicate to the MCU which physical end point a particular message refers to. For example, the chair system may send a message to the MCU indicating which participant is the current speaker. By providing the unique end point identifier, the MCU is able to select the appropriate input stream.

Figure 5:
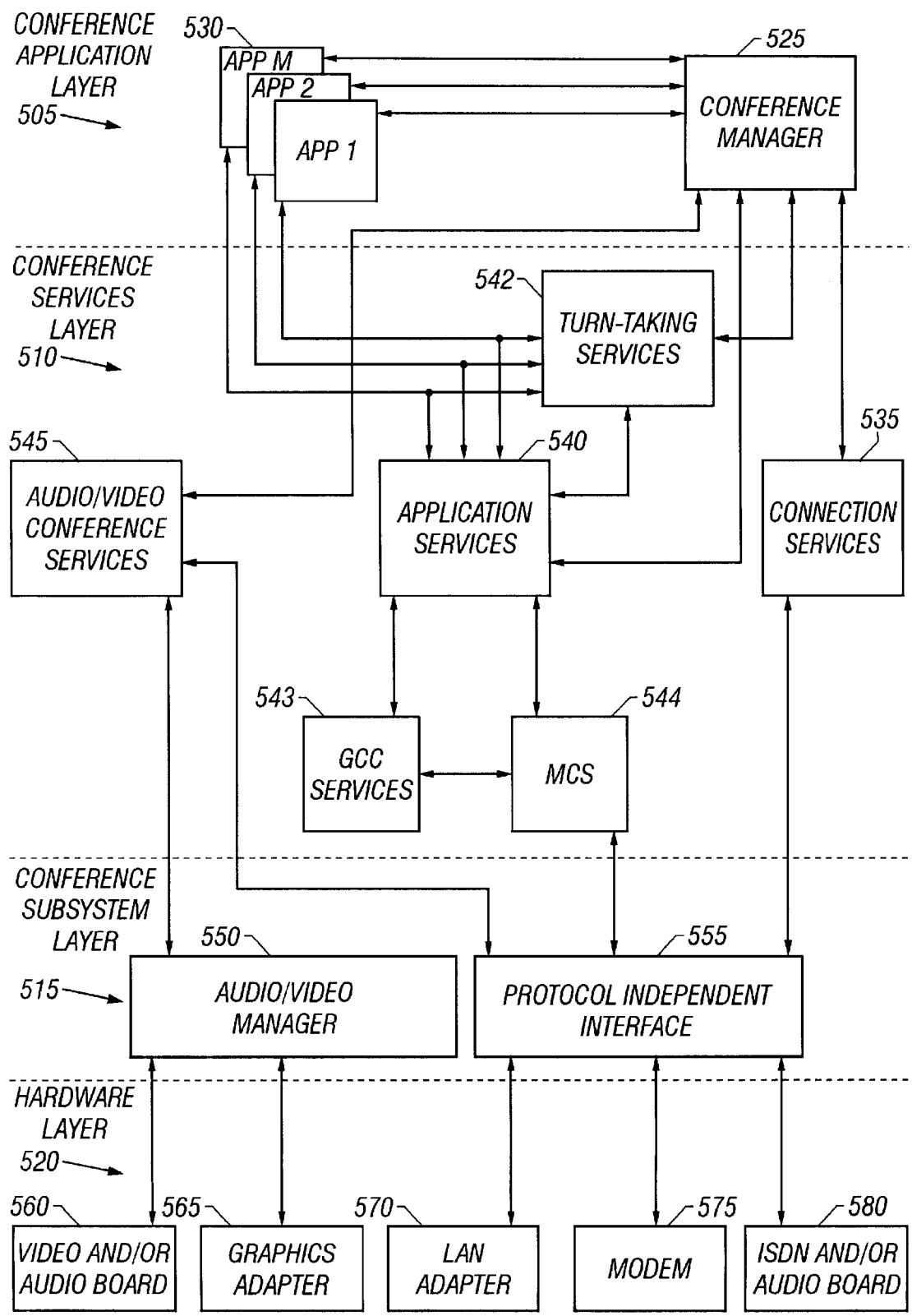
FIG. 5 is a block diagram showing the architectural overview of conferencing on an end point according to one embodiment of the present invention.

FIG. 5 is a block diagram showing the architectural overview of conferencing on an end point according to one embodiment of the present invention. As shown in FIG. 5, the conferencing architecture is separated into multiple layers. These layers are conference application layer 505, conference service layer 510, conference subsystem layer 515, and hardware layer 520.

Conference application layer 505 includes conference manager 525 and multiple applications 530. Conference manager 525 provides a conferencing interface to the user of the end point. In one embodiment, the conferencing interface is a graphical user interface (GUI). In one implementation, conference manager 525 includes options, such as through a menu, which allows the end point user to add or delete applications to the conference.

Applications 530 are M applications which represent any of a wide variety of conventional software applications. In one embodiment of the present invention, one of the applications 530 is a notebook application which is provided by the ProShare™ conferencing system. The notebook application is an application which allows the end point users to input text and/or drawings for the conference. In one implementation, additional applications are, for example, application sharing software, a high-quality image sharing application(s), or a file transfer application(s).

Conference application layer 505 is coupled to conference service layer 510. Conference service layer 510 includes connections services 535, application services 540, turn-taking services 542, generic conference control (GCC) services 543, multipoint communication services (MCS) 544, and audio/video conference services 545. Connection services 535 establishes and maintains connections with the other end point(s), via the MCU if necessary. Connection services 535 interfaces between the conference subsystem layer 515 and conference manager 525 when establishing connections which are initiated by either this end point or another end point. In one embodiment, connection services 535 also includes address book services which provide services related to managing connection addresses for conference participants.

Application services 540 provides an interface between applications 530 and conference manager 525, and conference subsystem layer 515. Application services 540 also provides an interface between applications 530 and conference manager 525, and GCC services 543 and MCS 544. In one implementation, application services 540 also prevents one application from unfairly dominating the communication services of lower layers.

Turn-taking services 542 provides an interface between applications 530 and conference manager 525, and application services 540. Turn-taking services 542 provides a library of procedure calls to support turn-taking and maintains the necessary information to support the turn-taking of the present invention.

In one embodiment of the present invention, the tokens used by the present invention are maintained by turn-taking services 542 of FIG. 5. Turn-taking services 542 maintains a record of the tokens for each application in the conference as well as the current owner of the token and whether the application is currently in free-for-all or turn-taking mode. In one implementation, this record is maintained in RAM 321 of FIG. 3. In one embodiment, turn-taking services 542 provides a separate token for each application in the conference (e.g., an application which is part of application sharing, the ProShare™ notebook, the audio/video portion of the conference, etc.). When a change is made as to the holder of a token, turn-taking services 542 of the end point making the change broadcasts a message to all other end points indicating the change. When an end point receives such a message, the turn-taking services of the receiving end point updates its records to reflect the change. The nature of these changes is described in more detail below.

GCC services 543 maintains a record of the applications 530 which are executing on the end point and provides registry services to allow applications 530 to register with GCC services 543. In one implementation, GCC services define a service layer as described in the T.124 Draft Recommendation by ITU—Study Group 8, available from Intel Corporation of Santa Clara, Calif.

MCS 542 provides support for full-duplex multipoint communication among an arbitrary number of connected application entities over a variety of conventional networks. In one implementation, MCS 542 provides multipoint message routing and message broadcasting. The multipoint message routing ensures that the other end points all receive messages from this system in the same order, and identifies the shortest path to each of the other end points. Message broadcasting allows connection information to be broadcast to all end points in the conference. In one implementation, MCS 542 defines services described in Recommendation T.122, "Multipoint Communication Service for Audiographic and Audiovisual Conferencing: Service Definition", 1993, and Recommendation T.125, "Multipoint Communication Service: Protocol Specification", 1994, both available from Intel Corporation of Santa Clara, Calif.

Audio/Video conferencing services 545 provides an interface between conference subsystem layer 515 and conference manager 525. Audio/Video services 545 provide sampling, digitization, compression/decompression of audio signals exchanged between two end points over a full-duplex audio connection, as well as capture and playback services for video streams including interfacing with the proper CODEC to compress and decompress the video signals.

Conference subsystem layer 515 operates in a conventional manner to provide an interface between the protocol-independent conference service layer 510 and the specific protocols of the devices in hardware layer 520. Audio/video manager 550 provides an interface which receives audio and video data from audio/video conference services 545 and outputs it to the hardware layer 520 for display or audio play.

Protocol independent interface 555 provides an interface between the components of conference service layer 510 and hardware layer 520. Interface 555 receives data and messages from the components of conference service layer 510 and converts the information received to the proper format based on the hardware connected to the system.

Hardware layer 520 includes video and/or audio board 560 and graphics adapter 565. The board 560 and adapter 565 are conventional computer system boards for realizing video and/or audio outputs. For example, the video outputs may be realized on a display device and the audio outputs may be realized via a computer system speaker.

Hardware layer 520 also includes a LAN adapter 570, modem 575, and ISDN and/or audio board 580. LAN adapter 570 is a conventional LAN adapter, such as an Ethernet adapter. Modem 575 is a conventional line for coupling the end point to a POTS line. ISDN and/or audio board 580 is a conventional ISDN line which can also include audio support.

It is to be appreciated that, depending on the conferencing environment, all of the components of hardware layer 520 may not be included. For example, LAN adapter 570 may not be included in one of the end points.

Figure 6:
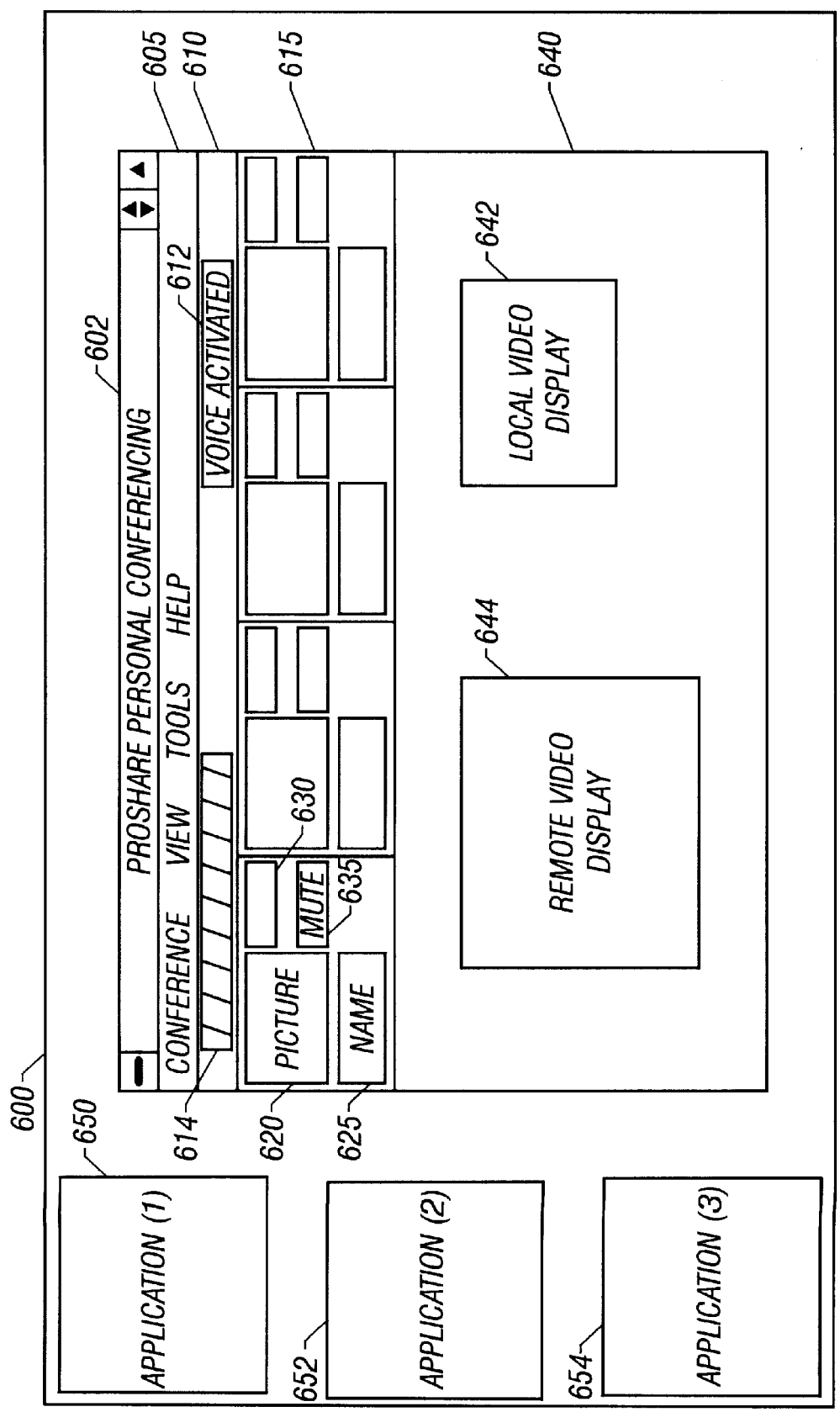
FIG. 6 is a graphical user interface of an end point in a conferencing environment according to one embodiment of the present invention.

FIG. 6 is a graphical user interface (GUI) of an end point in a conferencing environment according to one embodiment of the present invention. Display 600 is shown including an audio/video conferencing window 602, which includes menu bar 605 and an icon bar 610. Icon bar 610 includes label 612 which indicates whether the conference is in voice-activated or chaired mode. In one embodiment, label 612 indicates the name of the chairperson when the conference is in chaired mode. Additional icons 614 relating to the conference are also included, such as help, disconnect, change to chaired mode, etc.

Each of the multiple end points recognizes an A/V chair token and maintains a record of whether the system has the A/V chair token at any particular time. In one embodiment, this record is maintained by turn-taking services 542 of FIG. 5 in each end point. In one implementation, the A/V chair token is represented by a location in memory. If the memory location has a first state, then the system does not have the A/V chair token; however, if the memory location has a second state, then the system does have the A/V chair token.

Audio/video conferencing window 602 also includes a conference participant display 615. Participant display 615 includes a picture 620, name 625, current speaker button 630, and mute button 635 for one end point in the conference. Picture 620 provides a still picture of the conference participant at the end point. In one embodiment of the present invention, conference participants exchange electronic business cards at the beginning of the conference. Each business card includes a still picture of the conference participant. In one implementation, picture 620 is the image from the participant's electronic business card.

Name 625 is the name of the conference participant at the end point. In one embodiment, the names of all conference participants are stored in the address services of each end point.

Current speaker button 630 can be used by the chairperson when the conference is in chaired control to change which conference participant is the current speaker. When speaker button 630 is pressed (e.g., clicking on a mouse button while a pointer is over speaker button 630), the conference participant at that end point becomes the current speaker. In one embodiment of the present invention, an additional border is placed around picture 620 and name 625 when the participant at that end point becomes the current speaker. In an alternate embodiment, the border around the picture 620 and name 625 is changed to a different color when the participant becomes the current speaker.

Mute button 635 allows the chairperson in a chaired conference to mute the end point, thereby preventing the conference participant at that end point from making audio inputs to the conference, regardless of whether he or she is the current speaker. When a conference participant is muted, the chair system sends a message to the MCU indicating that the participant is to be muted. In response, the MCU ignores all audio inputs received from that participant. Alternatively, the message may be forwarded to the muted end point, and all audio inputs are dropped at the end point. Thus, additional audio inputs from that user are not mixed with other audio inputs from other participants until the participant is un-muted.

In one embodiment, participant display 615 also includes pictures, names, conference participant buttons and mute buttons for every other end point in the conference. In one implementation, participant display 615 also includes the picture and name of the user of this end point, as well as conference participant and mute buttons for this system.

Audio/video conferencing window 602 also includes information display area 640. Display area 640 as shown includes local video display 642 and remote video display 644. In one embodiment, local video display 642 provides the image from the video camera coupled to this end point. Thus, local video display 642 provides the participant with a display of how other conference participants see him or her. Remote video display 644 displays the current speaker of an audio/video conference. In one implementation, remote video display 644 displays the input video stream received from the MCU.

Display 600 also includes application 650, application 652 and application 654. Each application 650, 652 and 654 can be a separate application which is being shared in the conference. Applications 650, 652 and 654 can be any of a wide variety of conventional software application programs, such as the ProShare™ notebook, word processors, databases, spreadsheets or drawing programs.

Figure 7:
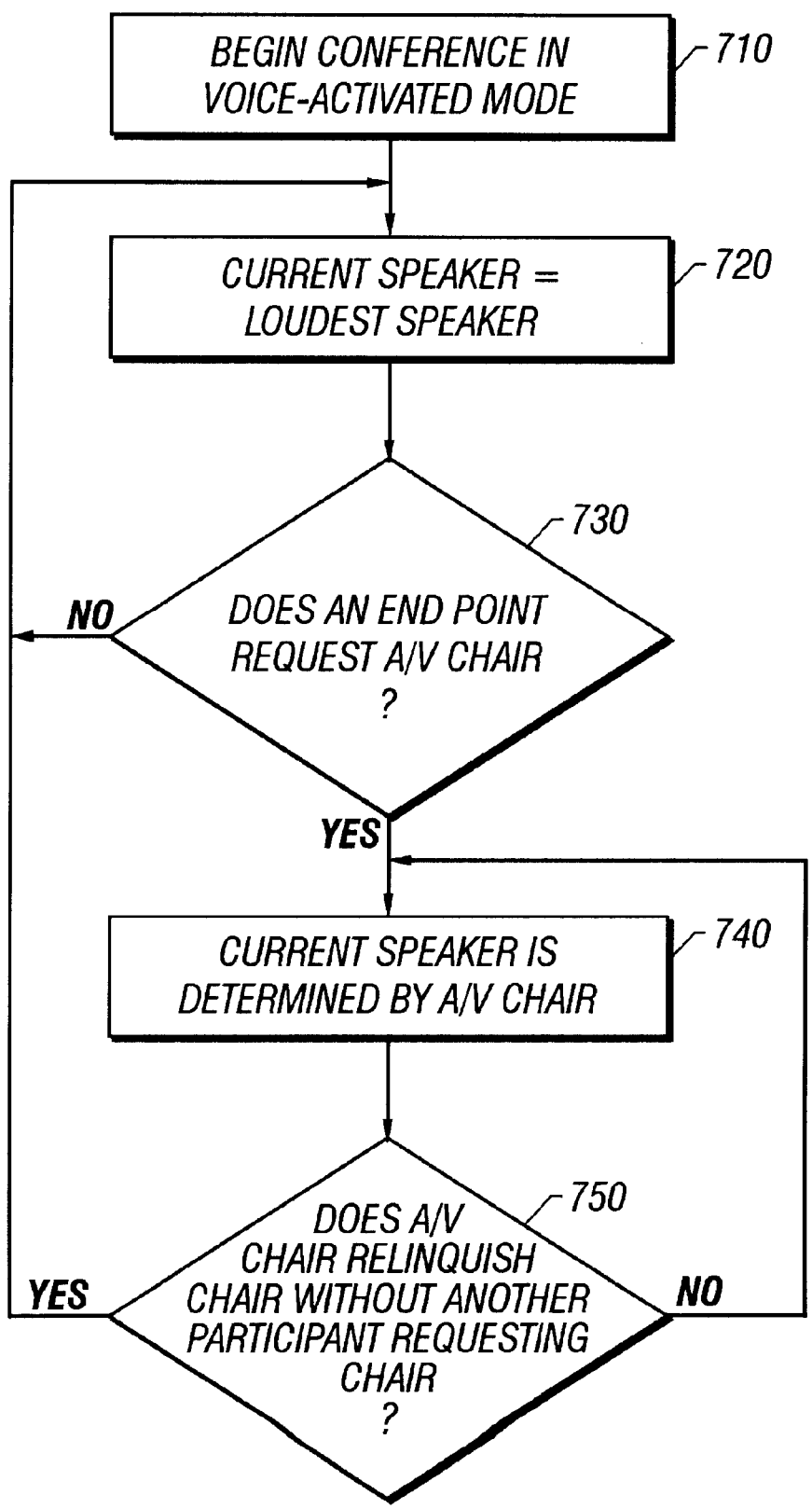
FIG. 7 is a flowchart showing the steps followed in determining the current speaker of a conference according to one embodiment of the present invention.

FIG. 7 is a flowchart showing the steps followed in determining the current speaker of a conference according to one embodiment of the present invention. The conference initially begins in voice-activated mode, step 710. The current speaker is the speaker whose input to the conference is loudest, step 720. In one implementation, which speaker is the loudest is determined by the MCU.

The current speaker continues to be the loudest speaker until a participant requests to be the chairperson, step 730. Each conference participant has the option to change the control to chaired control. This option can be provided to the participants in any of a wide variety of conventional manners. For example, a menu in the toolbar could include an option to change to chaired control, or a button may be in the toolbar or elsewhere on the screen which changes the conference to chaired control.

In one embodiment of the present invention, a particular conference participant can be pre-identified as the chairperson. In one implementation, the end point which initiates the conference sends a message to all newly joining end points identifying the chairperson, even if the chairperson has not joined the conference yet. The connection services of each end point keeps a record of the current conference participants. In this embodiment, as soon as the pre-identified participant joins the conference, each of the end points updates their records to indicate the system is in chaired mode.

Once a request to be chairperson is made, the requesting individual becomes the chairperson. The MCU ceases operating in voice activated mode. The chairperson then determines the current speaker, step 740. In one embodiment, when a participant selects chaired control, that participant becomes both the current speaker and the chairperson. The current speaker continues to be determined by the chairperson until the chairperson relinquishes the chair without another individual requesting the chair, step 750. In one implementation, only the chairperson can relinquish the chair; another individual cannot force the chairperson to relinquish the chair. In one implementation, relinquishing the chair is performed by clicking on the A/V chair button again, as described above. If the chair is relinquished, then the conference returns to voice-activated mode, step 720. It should be noted that the participant who is the chairperson can change multiple times in steps 740 and 750. However the chairperson, whichever participant that is at a particular time, is the person who chooses the current speaker at that particular time.

Figure 8:
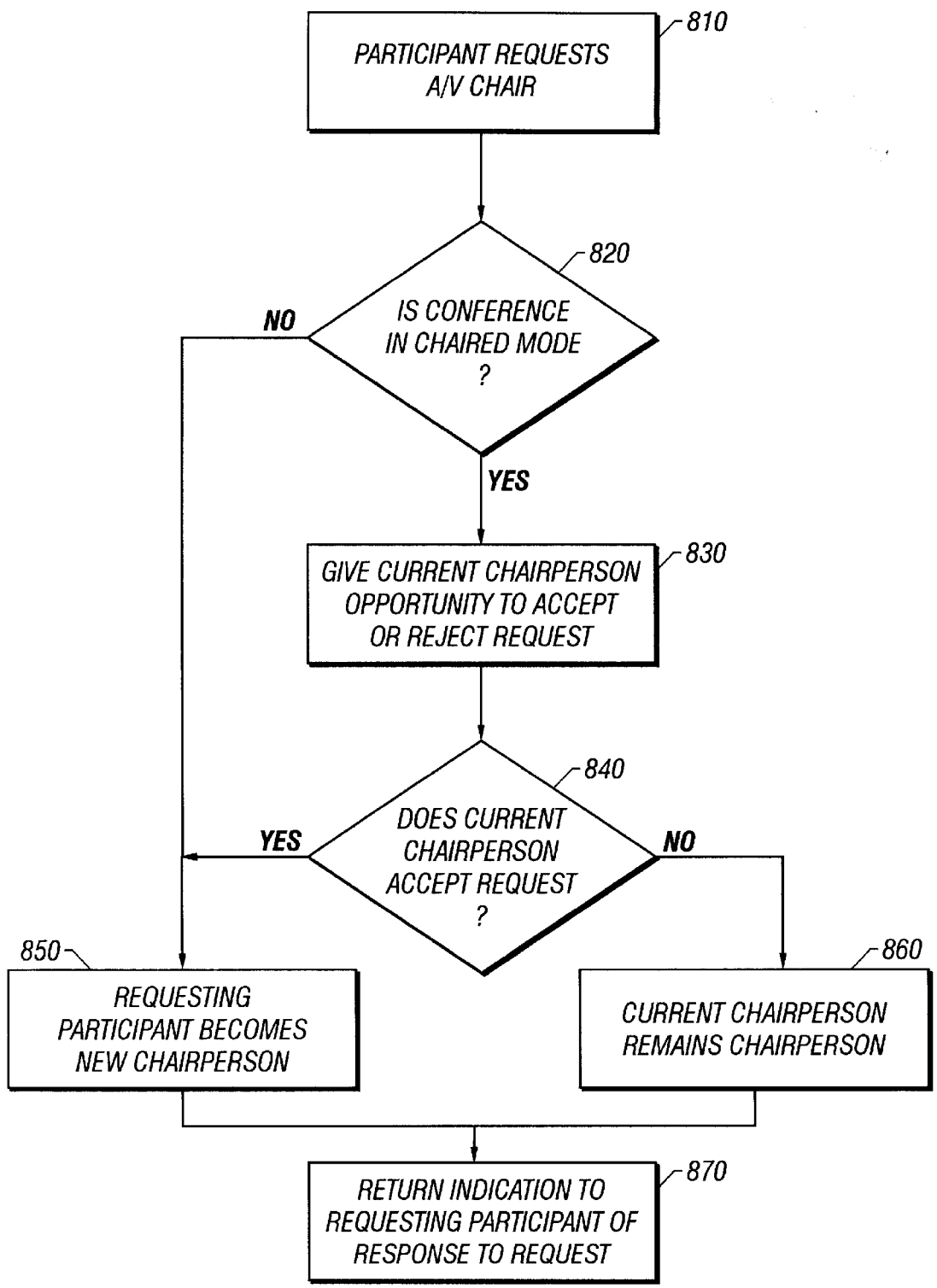
FIG. 8 is a flowchart showing the steps followed in transferring chairperson control according to one embodiment of the present invention.

FIG. 8 is a flowchart showing the steps followed in transferring chairperson control according to one embodiment of the present invention. Initially, a conference participant requests the A/V chair token, step 810. As described above, this can be, for example, by selecting a button in a toolbar of a GUI. Upon receiving the request, the end point checks whether the conference is currently in chaired mode, step 820. In one embodiment, each of the end points maintains a record of whether the system is in chaired or voice-activated mode. In one implementation, this indication is represented by a location in RAM.

If the conference is not in chaired mode (e.g., the conference is in voice-activated mode), then the requesting participant becomes the chairperson, step 850. The chair system sends a message to all other end points indicating that the user at the chair system has become the chairperson. In response, each of the other end points record that the conference is now in chaired mode and that this system is the chair system.

In one embodiment of the present invention, if requests to be the chairperson are made by multiple users before all end points have recorded the switch to chaired mode, then the system which is first in time becomes the chair system. If both requests are received simultaneously, then the chairperson is selected randomly from among the concurrent requests. In one implementation, a user which unsuccessfully requests to be chairperson receives a message from the chair system that the request was unsuccessful.

However, if the conference is currently in chaired mode, then the current chairperson is given the opportunity to accept or reject the request, step 830. In one embodiment of the present invention, this opportunity is provided by the chair system using a dialog box. That is, the requesting system sends a message to the chair system that another participant has requested the chair. The chair system provides a dialog box to the chairperson in response to this message, which informs the chairperson of the request. In one implementation, the dialog box indicates the identity, such as by name and/or picture, of the participant requesting the chair. The chair system then provides the chairperson with two hot buttons (such as "yes" and "no"), from which to respond to the request. In one implementation, the chair system waits a predetermined amount of time for a response from the chairperson, and if no response is received within that predetermined amount of time, the chair system responds to the requesting system by sending a message to the requesting system indicating that the request was rejected. In one implementation, the predetermined amount of time can be set and changed by the participant.

The requesting system then checks whether the current chairperson accepts the request, step 840. If the current chairperson accepts the request, then the requesting participant becomes the new chairperson, step 850. In one embodiment, the system of the new chairperson sends a message to all other end points indicating that this person is the new chairperson and that this system is the new chair system. Alternatively, a message may be sent to all other systems indicating the new chairperson and chair system by the previous chair system at the time the acceptance of the request is sent to the requesting system.

However, if the current chairperson rejects the request, then the current chairperson remains the chairperson, step 860.

Regardless of whether the request was accepted or rejected, the requesting system indicates to the requesting participant the response to the request, step 870. In one embodiment, an acceptance is indicated to the user of the end point by changing the A/V chair button on the new chairperson's display, as discussed above with reference to FIG. 6. In this embodiment, a rejection is indicated using a dialog box stating that the request has been rejected.

In one embodiment of the present invention, the chair system provides the chairperson with the opportunity to disable notification of requests for the A/V chair token. In one implementation, this is done by providing a button in the toolbar. Alternatively, a menu option may be provided. In this embodiment, the chair system rejects any requests for the A/V chair token without providing any notification to the chairperson. Alternatively, the MCU may reject the requests. In one embodiment, the chair system sends a message to all other end points that disables their request button (or menu option).

In one embodiment of the present invention, the end points and MCU allow each participant to select which other participant he or she is viewing. As described above, visual inputs from each system are input to the MCU. Generally, which one of these multiple inputs is output by the MCU to all end points is determined by whether the conference is in chaired mode or voice-activated mode, as described above. In this embodiment, however, each participant can select who he or she is viewing. This is provided, according to one implementation, by an additional option presented to the participant through the GUI. For example, an additional button can be added for each end point in participant display 615 of FIG. 6. By activating this button (e.g., by clicking on the button) for a particular end point, the conference participant at that display is seen and heard rather than the current speaker. The user can then select another user, or return to the normal control mode by clicking on the button again, or, alternatively, by clicking on the button of the current speaker (the border surrounding the current speaker can be different to identify him as such). Thus, in this embodiment conference participants are able to see and hear exactly who they wish to see and hear. This can be beneficial, for example, to allow participants to observe others' reactions to a speaker rather than the actual speaker.

When a selection is made at an end point to view a specific individual, the end point sends a message to the MCU indicating it should receive video and audio inputs from the selected remote site. The MCU then transfers the video and audio inputs from the selected site to the requesting site, rather than the video and audio inputs indicated by voice-activated or chaired mode. In one embodiment, the MCU continues to transfer the inputs from the selected remote site to the requesting site until it receives a message from the requesting site to terminate the transfer (and revert to the voice-activated or chaired mode for the system). In an alternate embodiment, the MCU continues to transfer the inputs from the selected end point until a change in the current speaker is made, either by the chairperson or when in voice-activated mode.

In one embodiment of the present invention, this manual selection of conference participants to see and hear can be deactivated. Thus, a conference participant can prevent other participants from seeing and hearing him or herself. In one implementation, this user-selection is deactivated by the end point indicating to the MCU that the option should be de-activated for that end point. The MCU then does not provide the button next to that user's image.

In one embodiment of the present invention, all audio is provided to each end point even though the video output may be limited. That is, the MCU receives audio inputs from the end points (which is gathered at the end points, for example, using conventional microphones). These audio inputs are then mixed in a conventional manner, and the resulting mixed audio signal is output to all of the end points. Thus, conference participants are able to hear everyone in the conference, even though they may not be able to see everyone.

In addition to the A/V chair token discussed above, tokens are also used in data conferences. Token control is slightly different in a data conference (or the data portions of an AVD conference) than in an audio/video conference. In one embodiment, an application token exists for each of the applications which is part of the conference. Alternatively, a single token may exist for all of the applications.

In one embodiment of the present invention, each of the end points provides control options for the conference participants to switch between manual and automatic grabbing and releasing of the application tokens. In one implementation, these options are provided through a menu from the menu bar. The end points provide four options: (1) automatic grab and automatic release, (2) automatic grab and manual release, (3) manual grab and automatic release, and (4) manual grab and manual release.

When an application is in automatic grab mode, the end point attempts to obtain the token for the application as soon as the participant using the end point begins making changes to the application data. These changes can be, for example, entering or deleting text, performing a line drawing, re-arranging text, a mouse-down event, etc. In one embodiment of the present invention, changes which are input by a user when the end point does not have the appropriate application token are displayed to the user and temporarily stored by the end point in RAM. The turn-taking services then attempts to grab the token. If the grab is successful, then the temporarily stored changes are input to the application. However, if the grab is unsuccessful, then the temporarily stored changes are discarded by the end point. Any temporarily stored changes which are discarded thus disappear from the display.

In an alternate embodiment, changes to the application cannot be made until the token is actually grabbed. Thus, in this embodiment there may be a slight pause between a participant attempting to make changes and the participant actually making the changes. When the application is in manual grab mode, the end point attempts to obtain the token for the application upon receiving a request for the token from the end point user. This request can be, for example, selection of a menu item or an icon in the toolbar.

When an application is in automatic return mode, the end point monitors the amount of time the participant has been continuously idle while the system holds the token. If the participant has been continuously idle for longer than a predetermined period of time, the end point automatically releases the token for the application. When an application is in manual return mode, the end point holds the token until the user indicates to release the token, such as by selecting a menu option or icon in the toolbar.

In one embodiment, the turn-taking services of the present invention are provided by turn-taking services 542 of FIG. 5. Several interface commands are supported by the turn-taking services; these commands are shown below in Table I.

In one embodiment of the present invention, the commands shown in Table I are also used by the turn-taking services to support the A/V chair token. In this embodiment, the A/V chair token is a token which corresponds to and is created by the turn-taking services. Certain of the following commands, however, are not applicable to the A/V chair token. In one implementation, only the ttRegister, ttDeregister, ttCreate, ttDestroy, ttEnable, ttSetManualRelease, ttGrabWithLock, ttRelease, and ttIsOwner commands are used for the A/V chair token.

TABLE I

| | |
|---|---|
| ttRegister | Allows an application to register with application services and initializes the conference for turn-taking services with the application. A message is sent to the other end points indicating that this application has registered for turn-taking services. |
| ttDeregister | Allows the application to deregister with application services, cleaning up all internal turn-taking data associated with the application's token in all end points. A message is sent to the other end points indicating that this application has de-registered for turn-taking services. |
| ttCreate | Called by the application to generate the turn-taking token. In one implementation, each application makes the call when it begins executing. |
| ttDestroy | Allows the application to destroy a previously created token without deregistering from application services. |
| ttEnable | A toggle which turns turn-taking on and off for the application and all corresponding applications at other end points (e.g., the ProShare ™ notebook executing at all endpoints). When turn-taking is on (enabled), the token is used. When turn-taking is off (disabled), the token is ignored. |
| ttSetReleaseInterval | Allows the application to inform turn-taking services what the timeout period is for automatic return of the token. In one implementation, the interval ranges between zero and 60 seconds. |
| ttSetManualRelease | Allows the application to require manual release of the token or allow optional manual release of the token. |
| ttCancelTimer | Allows the application to cancel the timer in turn-taking taking services for automatic return of the token. The call is made whenever an action (e.g., a mouse down event, entering of text, etc.) is taken by the user in the application. |
| ttStartTimer | Allows the application to restart the timer in turn-taking services for automatic return of the token. The call is made whenever actions have been halted by the user (e.g., a mouse up event, input from the keyboard has ceased, etc.). |
| ttGrab | Allows the application to initiate automatic and manual grab of the token. The application makes this call as soon as the user attempts to begin alteration of the application data. The application services indicates to the application whether the turn is available (that is, the grab was successful or unsuccessful). The application then either accepts or rejects the turn. If the turn is accepted, a message is sent to the other end points indicating that the token has been grabbed. |
| ttGrabWithLock | Same as ttGrab, except it also turns off automatic release for the turn. |
| ttRelease | Allows the application to release the token. A message is sent to the other end points indicating that the token has been released. |
| ttSteal | Allows the application to take the token from its current owner without asking for the token. In one implementation, only the host system of a shared application (that is, the system which is executing the application) can make this call. |
| ttIsOwner | Allows the application to determine whether it is the current owner of the token. The turn-taking services returns an indication of whether the end point currently has the token for the application. |

Figure 9:
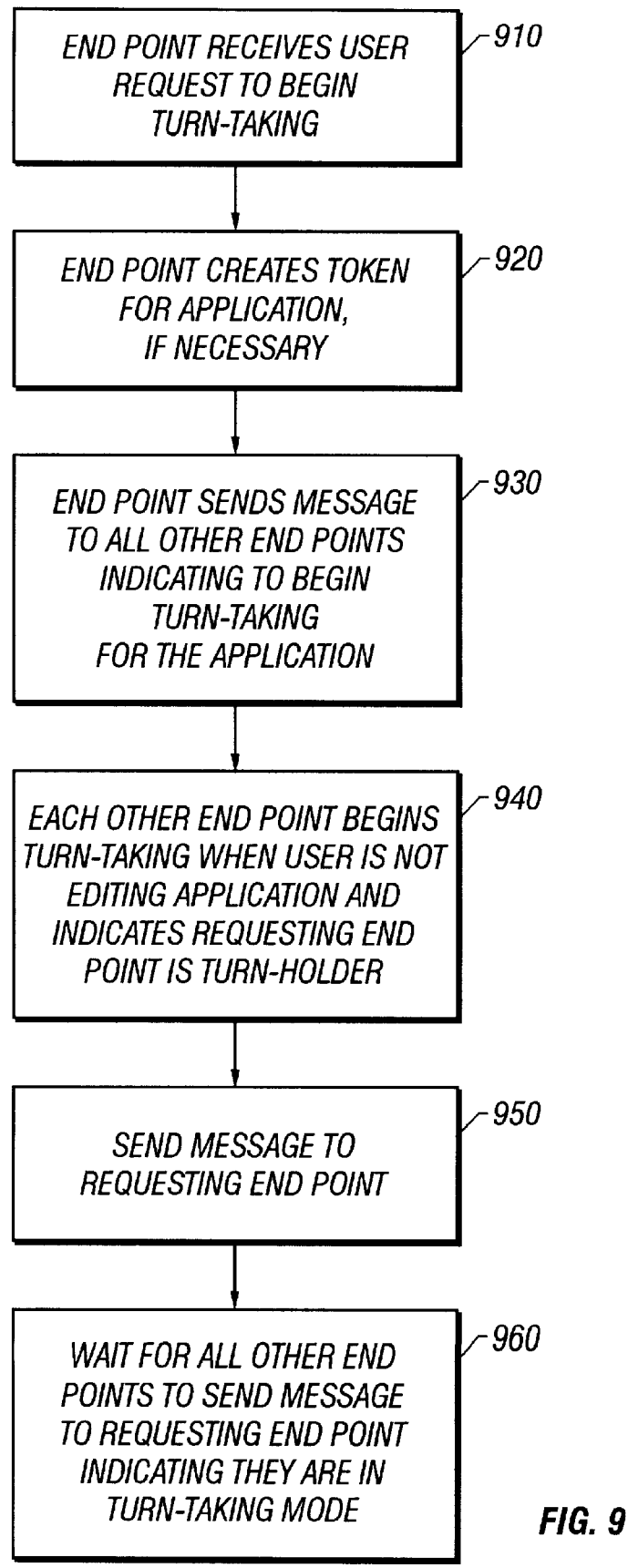
FIG. 9 is a flowchart showing the steps followed in the present invention in transitioning from free-for-all mode to turn-taking mode in a conference according to one embodiment of the present invention.

FIG. 9 is a flowchart showing the steps followed in the present invention in transitioning from free-for-all mode to turn-taking mode in a conference according to one embodiment of the present invention. An end point in the conference, referred to as the requesting system, first receives a user request to transition to turn-taking mode, step 910. In one embodiment of the present invention, the operating modes of the shared applications in the conference are independent. Thus, each shared application can have a different operating mode. In an alternate embodiment, all applications have the same operating mode and share the same token.

Requests can be received by the end point in several ways. For example, when in a free-for-all, the participant may click on an A/V chair button to switch the system to turn-taking mode. The participant can then select a "manual grab token" option from a menu, indicating that the end point should obtain the token for the application. Alternatively, a separate "turn-taking" menu option or hot button may exist, the selection of which indicates to the end point that the user desires to enter turn-taking mode.

Once the request is received, the end point creates a token for the application if necessary, step 920. If a token was previously created for this application, then the end point does not generate a new token in step 920. Rather, the previously generated token is used.

Once the token is created, the requesting system sends a message to all other end points indicating that the conference is to switch to turn-taking mode for that application, step 930. Each of the end points then enters turn-taking mode for the application, step 940. If the participant using the end point is currently making changes to the application (e.g., entering text, performing line drawings, etc.), then the end point waits to enter turn-taking mode until the participant has completed making changes (e.g., as soon as the user stops typing or drawing). In one implementation, when the end point enters turn-taking mode for the application, the application provides the identity of the user who requested (and is obtaining) the turn to the user of the end point.

Once the end point enters turn-taking mode, the end point sends a message to the requesting system indicating it has entered turn-taking mode, step 950. The requesting system waits for all other end points to send messages indicating that they have entered turn-taking mode, step 960. Once a message is received from each end point, the conference is in turn-taking mode for this application.

In one implementation, once the conference is in turn-taking mode, the end point then attempts to grab the token when requested by the participant. In an alternate implementation, the end point which requested that the conference enter turn-taking mode for the application receives the token as soon as the conference is in turn-taking mode.

In one embodiment of the present invention, an application can be switched from turn-taking mode to free-for-all mode at any time. In one implementation, this can only be done by the user which holds the token for the application. When the application is to return to free-for-all mode, the end point sends a message to all other end points indicating that the application is to transition to free-for-all mode. Upon receipt of the message, each end point records the change in operating mode for the application.

Figure 10:
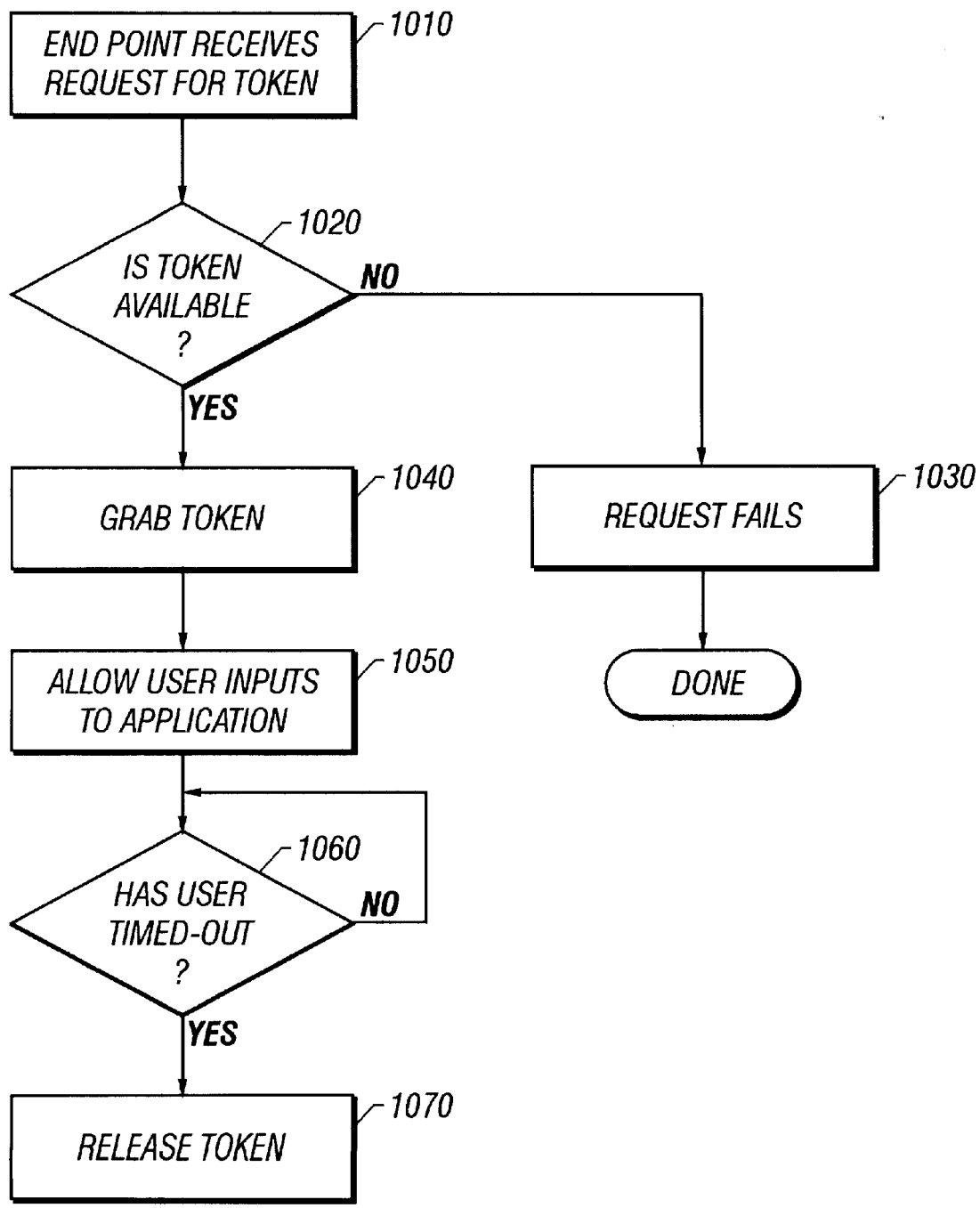
FIG. 10 is a flowchart showing the steps followed in allowing a user of a shared application in turn-taking mode to make changes to the application according to one embodiment of the present invention.

FIG. 10 is a flowchart showing the steps followed in allowing a user of a shared application in turn-taking mode to make changes to the application according to one embodiment of the present invention. The end point first receives a request from a user for the turn, step 1010. In one embodiment of the present invention, requests are received by the end point from the selection of a "manual grab token" option from a menu. In an alternate embodiment of the present invention, the application continuously monitors the system user's actions. When the system user begins altering a shared application's data which is in turn-taking mode, the application sends a request to the turn-taking services (e.g., ttGrab) for the token. This request begins the process of obtaining the token. This data alteration can be, for example, entering or deleting text, performing a line drawing, re-arranging text, etc. In one implementation, changes made before the token is received are stored temporarily and then either input to the application or discarded, depending on whether the grab was successful or unsuccessful, as described above.

Once the request is received, the end point checks whether the token for the application is available, step 1020. As discussed above, each end point maintains a record of the tokens for the shared applications and who the current owner is. If the token for the application is not available, then the request fails, step 1030. In order to obtain the token, the participant must request the token again, step 1010.

If the token is available, the end point grabs the token, step 1040. When grabbing the token, the end point sends a message to all other end points that this end point has the token. In one embodiment, when the token is available, the application on the end point is given the option to accept or reject the token. If the application rejects the token, then the end point does not grab the token in step 1040. Typically, the application accepts the token. However, if the period of time between beginning the grab and actually receiving the token is too long, then the application may reject the token.

Once the token has been grabbed, the end point permits the user to make changes to the application, step 1050. The application of the end point monitors the changes made by the user and resets a timer each time a change is made. If the timer exceeds a predetermined value then the user has timed out, step 1060. In one implementation, this predetermined value is set by the user. The user can continue to make changes until he or she times out or manually relinquishes the token. Once the user has lost the token, the end point releases the token for the conference, step 1070. The end point broadcasts a message to all other end points in the conference indicating that the token for the application is available. The applications in each of the end points receive this message and thus make the token available for other users.

In one embodiment of the present invention, the end point allows the user of the system with the token for a shared application to pass the token to a specific participant. In this embodiment, the current holder of the token for a shared application can pass the token by, for example, selecting a menu option or clicking on an icon and indicating the conference participant who is to receive the token. The end point then sends a message to all other end points of the change in token. Each end point, upon receipt of this message, changes its record to indicate the identity of the new token holder, which replaces the previous token holder. The end point of the new token holder records itself as being the holder of the token.

In one embodiment of the present invention, the conference manager provides several conference styles. A conference style refers to a sum of turn-taking styles for multiple portions of the conference, such as the ProShare™ notebook, application sharing, and audio/video. An end point, when beginning the conference, sends a message to all other end points indicating the turn-taking styles for each component of the conference. In one embodiment, all applications have the same turn-taking mode. Alternatively, each of the shared applications can have a different turn-taking mode. An end point can also initiate a conference style after the conference has already begun. However, the turn-taking style of an application or audio/video can only be changed by a participant who has the token for the application.

The conference styles supported by one embodiment of the present invention are shown in Table II. It is to be appreciated, however, that a wide variety of additional conference styles are supported by the present invention.

TABLE II

| Conference Style | Notebook | Application Sharing | Audio/Video |
| --- | --- | --- | --- |
| Informal Meeting | Free-For-All | Free-For-All | Voice-Activated |
| Formal Presentation | Manual Grab/ Manual Release | Manual Grab/ Manual Release | Chaired |

In one embodiment, the present invention is implemented as a series of software routines run by the end points. In one implementation these software routines are written in the C++ programming language. However, it is to be appreciated that these routines may be implemented in any of a wide variety of programming languages. In an alternate embodiment, the present invention is implemented in discrete hardware or firmware.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for controlling participant input in a conferencing environment has been described.

What is claimed is:

1. A method comprising:
    operating a conference wherein a plurality of end points are interconnected to exchange conference data based at least in part on the holding of an application token by a single token holder; and
    allowing each end point, independently during the conference, to select a combination of automatic or manual acquiring of the application token and automatic or manual releasing of the application token, said automatic acquisition based at least in part on participant activity in the conferencing environment;
    wherein only said single token holder may modify shared conference data.

2. The method of claim 1 wherein the conference data received by each end point comprises graphical data.

3. The method of claim 1 wherein the conference data received by each end point includes audio data.

4. The method of claim 1 further comprising:
    operating the conference in a first operating mode, wherein the first operating mode allows participant input at a first end point and participant input at a second end point to change conference data at will;
    maintaining the conference in the first operating mode until a request is received from a participant to change to a second operating mode; and
    changing, during the conference, the conference to a second operating mode, wherein the second operating mode allows, based on the holding of the application token, participant input at only one of the first end point and the second end point to change the conference data at a time.

5. The method of claim 1 wherein a message is broadcast to each end point when a change in the holder of the application token is made.

6. The method of claim 1 wherein the end point monitors the amount of time that the token holder is continuously idle and automatically releases the application token when the token holder has been continuously idle for a predetermined period of time.

7. A machine-readable medium having stored thereon sequences of instructions, which when executed by a processor, cause the processor to:

operate a conference wherein a plurality of end points are interconnected to exchange conference data based at least in part on the holding of an application token by a single token holder; and allow each end point, independently during the conference, to select a combination of automatic or manual acquiring of the application token and automatic or manual releasing of the application token, said automatic acquisition based at least in part on end point activity in the conference;

wherein only said single token holder may modify shared conference data.

8. The machine-readable medium of claim 7 wherein the conference data received by each end point comprises graphical data.

9. The machine-readable medium of claim 7 wherein the conference data received by each end point includes audio data.

10. The machine-readable medium of claim 7 further comprising sequences of instructions, which when executed cause the processor to:

operate the conference in a first operating mode, wherein the first operating mode allows participant input at a first end point and participant input at a second end point to change conference data at will;

maintain the conference in the first operating mode until a request is received from a participant to change to a second operating mode, said request causing said participant to obtain exclusive holding of the application token; and change, during the conference, the conference to a second operating mode, wherein the second operating mode allows, based on the holding of the application token, participant input from the token holder to change the conference data.

11. The machine-readable medium of claim 7 further comprising sequences of instructions, which when executed cause the processor to broadcast a message to each end point when a change in the holder of the application token is made.

12. The machine-readable medium of claim 7 further comprising sequences of instructions, which when executed cause the processor to monitor the amount of time that the token holder is continuously idle and to automatically release the application token when the token holder has been continuously idle for a predetermined period of time.

13. An apparatus comprising:

means for operating a conference wherein a plurality of end points are interconnected to exchange conference data based at least in part on the holding of an application token by a single token holder, wherein only said single token holder may modify shared conference data; and means for allowing each end point, independently during the conference, to select a combination of automatic or manual acquiring of the application token and automatic or manual releasing of the application token, said automatic acquisition based at least in part on participant activity in the conferencing environment.

14. The apparatus of claim 13 wherein the conference data received by each end point comprises graphical data.

15. The apparatus of claim 13 wherein the conference data received by each end point includes audio data.

16. The apparatus of claim 13 further comprising:

means for operating the conference in a first operating mode, wherein the first operating mode allows participant input at a first end point and participant input at a second end point to change conference data at will;

means for maintaining the conference in the first operating mode until a request is received from a participant to change to a second operating mode, said request causing said participant to obtain exclusive holding of the application token; and means for changing, during the conference, the conference to a second operating mode;

wherein the second operating mode allows, based on the holding of the application token, participant input from the token holder to change the conference data.

17. The apparatus of claim 13 further comprising means to broadcast a message to each end point when a change in the holder of the application token is made.

18. The apparatus of claim 13 further comprising means to monitor the amount of time that the token holder is continuously idle and to automatically release the application token when the token holder has been continuously idle for a predetermined period of time.

19. A conferencing system comprising:

a memory;

a processor coupled to the memory, the processor to cause the conferencing system to operate in a conferencing environment as one of a plurality of end points, wherein participant input to the conferencing system causes the conferencing system to receive conferencing data from another end point based on the participant input and further wherein the processor allows a user of the computer system, during the conference, to independently select a combination of automatic or manual acquiring of the application token and automatic or manual releasing of the application token, said automatic acquisition based at least in part on participant activity in the conferencing environment; and an output device coupled to the processor to output conference data;

wherein there is only a single token holder, and only such single token holder may modify shared conference data.

20. The conferencing system of claim 19 wherein the conferencing data is graphical data.

21. The conferencing system of claim 19 wherein the conferencing data is audio data.

22. The conferencing system of claim 19, wherein the processor initiates the conference in a first operating mode which allows the conferencing system to change conference data at will, and wherein the processor is capable of subsequently changing the conference, during the conference, to a second operating mode, wherein the second operating mode allows the conferencing system to change the conference data based on actions of the single token holder.

23. The conferencing system of claim 19 wherein a message is broadcast to each end point when a change in the holder of the application token is made.

24. The conferencing system of claim 19 wherein the amount of time that the token holder is continuously idle is monitored and the application token is automatically released when the token holder has been continuously idle for a predetermined period of time.

25. A conferencing environment comprising:

a network communications device; and a plurality of conferencing systems coupled to the network communications device and interconnected to share conference data, each conferencing system having at least one input device and at least one output device;

wherein each of the plurality of conferencing systems individually determine, during a conference, another conferencing system from which to receive conference data;

wherein each conferencing system independently determines, during the conference, a combination of automatic or manual acquiring of an application token and automatic or manual releasing of the application token, wherein said automatic acquisition based at least in part on activity of the plurality of conferencing systems during the conference; and wherein there is only a single token holder, and only such single token holder may modify shared conference data.

26. The conferencing environment of claim 25 wherein the network communications device is a local area network.

27. The conferencing environment of claim 25 wherein the network communications device is the Internet.

28. The conferencing environment of claim 25 wherein the conferencing data is graphical data.

29. The conferencing environment of claim 25 wherein the conferencing data is audio data.

30. The conferencing environment of claim 25, further comprising:

wherein a first conferencing system of the plurality of conferencing systems initiates a conference in a first operating mode;

wherein the first operating mode allows each conferencing system to change conference data at will;

wherein the first conferencing system is configured to subsequently change the conference, during the conference, to a second operating mode without mediating said mode change; and wherein the second operating mode allows, based on the holding by a token holder of an application token, only said token holder to change conference data.

31. The conferencing environment of claim 25 wherein a message is broadcast to each end point when a change in the holder of the application token is made.

32. The conferencing environment of claim 25 wherein the amount of time that the token holder is continuously idle is monitored and the application token is automatically released when the token holder has been continuously idle for a predetermined period of time.

\* \* \* \* \*